United States Patent [19]
Buckendorf, Jr.

[11] Patent Number: 5,092,112
[45] Date of Patent: Mar. 3, 1992

[54] GRASS TRIMMER ATTACHMENT

[76] Inventor: Rudy R. Buckendorf, Jr., 4111 S. 43d W. Ave., Tulsa, Okla. 74107

[21] Appl. No.: 496,894

[22] Filed: Mar. 21, 1990

Related U.S. Application Data

[63] Continuation of Ser. No. 316,328, Feb. 27, 1989, abandoned.

[51] Int. Cl.$^5$ .............................................. A01D 53/14
[52] U.S. Cl. ....................................... 56/17.5; 56/12.7
[58] Field of Search ........................ 56/12.7, 16.7, 17.5

[56] References Cited

U.S. PATENT DOCUMENTS

| | | | |
|---|---|---|---|
| 3,788,049 | 1/1974 | Ehrlich | 56/16.9 |
| 4,182,100 | 1/1980 | Letter | 56/16.7 |
| 4,442,659 | 5/1984 | Eubusk | 56/12.7 |
| 4,531,350 | 7/1985 | Huthmacher | 56/17.5 |
| 4,688,376 | 8/1987 | Wolfe | 56/16.7 |
| 4,704,849 | 11/1987 | Gilbert et al. | 56/16.7 |

Primary Examiner—John G. Weiss
Attorney, Agent, or Firm—Laney, Dougherty, Hessin & Beavers

[57] ABSTRACT

A wheeled attachment for a grass trimmer includes a mounting bar having a wheel at each end, detachably mountable to the grass trimmer to provide easy control and easy support for the grass trimmer. The detachable bar may be securable by a nut and bolt combination either to a housing or protective cover mounted on the grass cutting head immediately above the grass cutting element, or to an adjustable bar component which is detachably securable to the elongated shaft of the grass trimmer. For easy mounting upon the housing of a grass trimmer, the detachable bar includes adjustment slots for the nut and bolt fasteners so that the fasteners may be easily and quickly adjusted to the size of the housing component. For easy mounting upon the elongated shaft of the grass trimmer, the adjustable bar component includes two or more vertically extending bar members which are adjustably attachable to permit forward or rearward adjustment of the wheeled attachment. Further, the wheels may be preferably positioned on the mounting bar so that the distance between the two wheels on the mounting bar is less than the maximum cutting diameter of the flexible cutting line. Then, also, the wheels may be swivelably mounted.

11 Claims, 4 Drawing Sheets

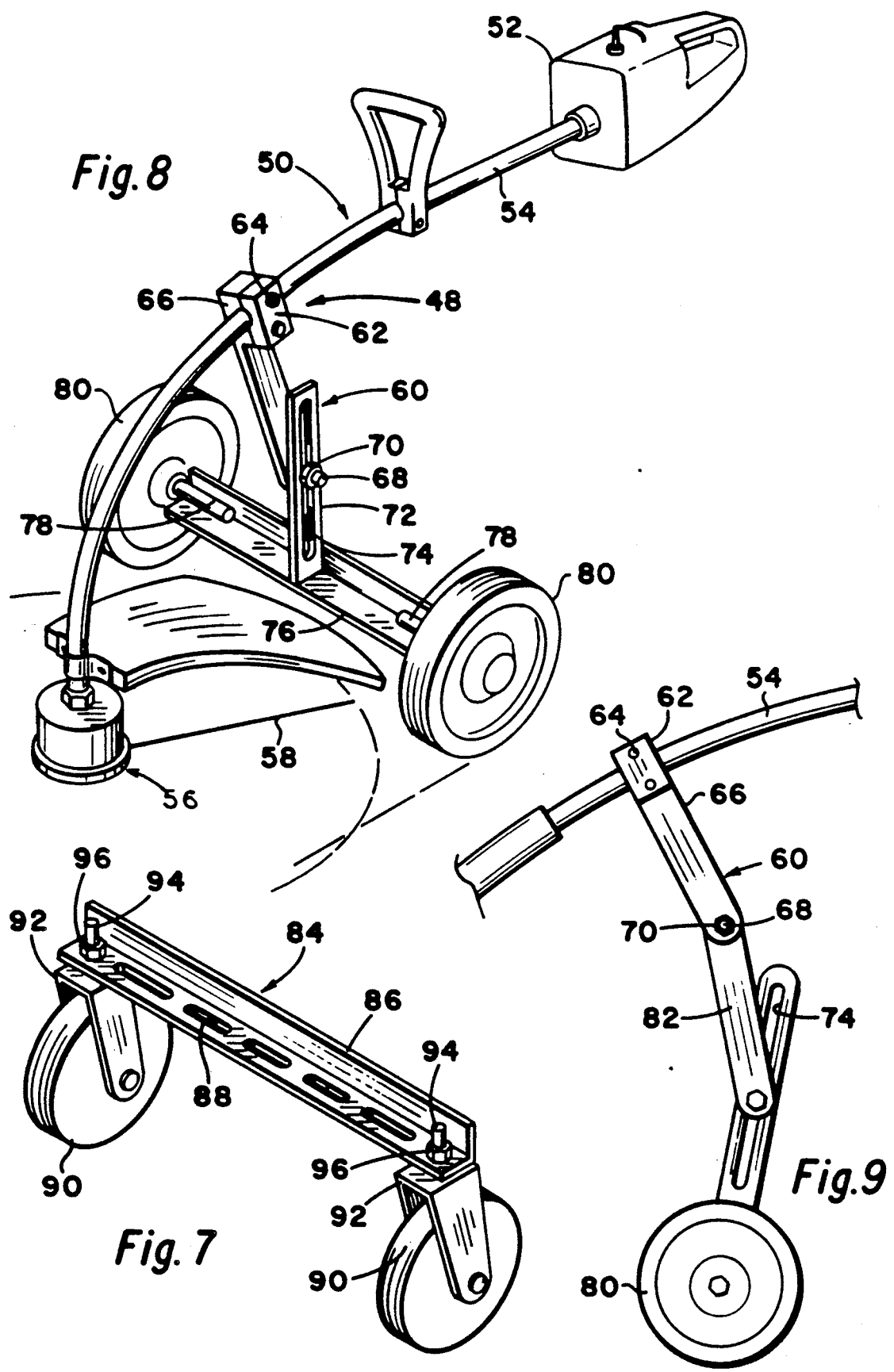

GRASS TRIMMER ATTACHMENT

This is a continuation of co-pending application Ser. No. 316,328 filed on Feb. 27, 1989, now abandoned.

FIELD OF THE INVENTION

My invention relates to grass trimmers. More particularly, my invention relates to grass trimmers having easily attachable wheeled components for converting an unsupported hand-lifted grass trimmer into a grass trimmer supported by the wheeled attachment.

BACKGROUND OF THE INVENTION

Rotary grass trimmers employing flexible line for accomplishing the cutting operation, rather than a steel blade, have become increasingly popular. The use of flexible line provides a much safer apparatus than does the use of a steel blade. Then, as a resulting advantage, the use of flexible line permitted the development of grass trimmers which were of lighter weight and therefore more easily manageable than, and used somewhat less power than, the trimmers which had steel blades.

The intrinsic advantages of the hand-held, flexible line trimmer have enabled users to operate this type of trimmer for a broad range of purposes, many more uses than had been generally considered with the heavier steel blade variety. People began to use this lighter weight, safer trimmer for multiple purposes: trimming grass along house foundations; trimming along fence lines; trimming, in what is commonly described as an "edging" operation, along a concrete sidewalk; and, even, while they have the trimmer available, utilizing the trimmer to mow small areas of grass.

However, as has already been recognized in the art, the use of the hand-held grass trimmer for multiple purposes is best accomplished by the use of some form of support frame attached to the grass trimmer. A wheeled support frame was found necessary for some purposes because the hand-held grass trimmer, simply held in the air above the area being trimmed, would cause uneven trimming and would be tiring to the user.

I have found in the prior art a number of patents for attachments and adaptations for the flexible line trimmer. These are shown in the following patents:

| | | |
|---|---|---|
| U.S. 4,077,191 | Pittinger, Sr. et al | March 7, 1978 |
| U.S. 4,182,100 | Letter | Jan. 8, 1980 |
| U.S. 4,205,439 | Sweet | June 3, 1980 |
| U.S. 4,224,784 | Hansen et al | Sept. 30, 1980 |
| U.S. 4,531,350 | Huthmacher | July 30, 1985 |
| G.B. 1,551,622 | Dawson | Aug. 30, 1979 |

SUMMARY OF THE INVENTION

The primary object of my invention is to provide a wheeled attachment for a grass trimmer which is easily and quickly attachable to the grass trimmer.

Another object of my invention is to provide a wheeled attachment for a grass trimmer which is inexpensive, conveniently attachable to the grass trimmer, and forms a grass trimmer which is easily maneuverable.

Still another object of my invention is to provide a wheeled attachment for a grass trimmer which will embody a grass trimmer which is sturdy and compact, and easy to use.

Still another object of my invention is to provide a wheeled attachment for a grass trimmer which is easily attachable to the grass trimmer in a manner to permit the trimmer to perform neat trimming operations in obstructed areas with minimal effort by the user.

Still another object of my invention is to provide a wheeled attachment for a grass trimmer to permit the converted trimmer to perform smooth, even, and easily controllable mowing operations.

Still another object of my invention is to provide a wheeled attachment for a grass trimmer in which the wheeled attachment does not impede the cutting action of the grass trimmer or limit the scope of the cutting area.

I have found that the advantages I have discussed above for the light-weight, hand-held, flexible line grass trimmer are enhanced by the attachment of my wheeled attachment because of the ease of attachment, adjustable accomodation, compactness, and further light-weight of my wheeled attachment itself.

Although I have developed a wheeled attachment for a grass trimmer which is sturdy and of strong steel construction, yet the attachment is still light-weight and provides a grass trimmer which is light-weight and easily controllable.

The flexible line grass trimmer includes power means for driving the flexible line rotatably at high speed to accomplish the cutting operation. The flexible line is commonly a plastic cord.

One type of grass trimmer for which I have designed my wheeled attachment is an electrically powered type which comprises a long shaft having one hand grip at a first end of the shaft, a second hand grip part way down the shaft, an electrical plug and control adjacent the first end of the shaft, an electric line passing interiorly of the shaft to an electric motor secured to the lower or second end of the shaft, with the motor cooperating with means for holding and driving rotatably a flexible grass cutting line. Usually, the grass trimmer includes a housing or protective cover mounted immediately above the grass cutting line or covering the electric motor to provide some safety from the rapidly rotating flexible line or from debris which the rapidly rotating line might fling during operation.

I have designed my wheeled attachment to be easily and quickly attachable to the grass trimmer to provide an easily controllable trimmer, lightweight, efficient grass trimmer which is easy and simple to use.

My wheeled attachment for the grass trimmer comprises a mounting bar which can be mounted transversely upon the housing of the trimmer, and which has a wheel at each end, thus providing the wheeled support close to the grass cutting head and out of the way of the user. I have provided for quick and secure attachment of the mounting bar to the housing by a nut and bolt combination, preferably a J-bolt and nut if the housing has a lip or flange along its lower side. If the grass trimmer does not have a housing or protective cover, or if the cover for the electric motor would prevent the mounting of the wheeled attachment upon the housing, then I have provided for securing the mounting bar and wheels at a position upon the shaft of the grass trimmer.

In another version of a grass trimmer, the power is supplied by a gasoline engine mounted adjacent one end of a long shaft with a cutting head at the opposite end. Flexible means for driving a cutting element extends interiorly of the shaft to the cutting element mounted within the cutting head.

In this type of grass trimmer, the gasoline engine prohibits the user from gripping the grass trimmer at the upper end, so a handle is placed lower on the elongated shaft than the upper end. Also, in this modification the cutting head usually does not have a protective housing suitable for mounting the wheeled attachment as conveniently as in the typical electrical model. Therefore, especially for this type of grass trimmer, I have provided for the wheeled attachment to be mounted on the elongated shaft above the cutting head. Further, I have designed my wheeled attachment in this version so that the user may adjust the attachment to suit various conditions of use, such as: proper balance of the grass trimmer, size of the cutting element, size and physical comfort of the user, and cutting height of the cutting element in regard to the surface of the ground.

To accomplish this degree of adjustment with this modification of my wheeled attachment, I have provided for the wheels to be attached to a lower member of a set of two or more vertically extending bar members including an upper bar member adjustably attached to an easily removable and adjustable clamp positionable at a selected place on the elongated shaft.

Preferably, for this gasoline engine type trimmer adaptation the lower bar member is secured to the transverse member of the wheeled attachment, as by welding, and this lower bar member includes means for adjustably attaching this lower bar member to an upper bar member. Such means for adjusting the lower bar member comprises either a slot extending length-wise of the bar member or a series of adjustment holes along the bar member. The upper bar member has attachment means adjacent its lower end, such as a nut and bolt, to cooperate with the lower bar.

Thus, the user may adjust the wheeled attachment as he desires, by sliding the clamp along the elongated shaft to a chosen position and by adjusting the lower bar member at a desired position in cooperation with the upper bar member and at a chosen position rearwardly in relation to the cutting head by cooperation with the upper bar member.

Of course, the wheeled attachment which I have just described as being attachable to the shaft of the grass trimmer, is readily suitable for attachment to any type of grass trimmer, gasoline or electric, which has a shaft to which the wheeled attachment may be secured.

One particular advantage of the type of wheeled attachment which may be attached to the elongated shaft of the grass trimmer is that the wheels may be inset somewhat; that is, spaced more closely together than if they were mounted on the transverse member mounted on the housing directly over the cutting head. I use the term inset to mean that the distance between the two wheels on the mounting bar is less than the maximum cutting diameter of the flexible cutting element. The inset wheels permit the grass trimmer to be used efficiently as an edging device without interference or limitation from the wheels.

I also contemplate that wherever desired, the wheels of my wheeled attachment may be swiverably mounted on the transverse mounting bar. Some users may prefer swivelable mounting of the wheels for easier control of the grass trimmer.

The above objects and advantages of my invention will become apparent from my description of the following preferred embodiments of my invention.

BRIEF DESCRIPTION OF THE DRAWINGS

FIG. 7 is a perspective view of a modified form of wheeled attachment for a grass trimmer according to my invention.

FIG. 8 is a perspective view of a second modified form of wheeled attachment for a grass trimmer according to my invention as it is in position upon a typical gasoline-powered grass trimmer.

FIG. 9 is an enlarged side elevational view of the embodiment of wheeled attachment shown in FIG. 8 with the grass trimmer shown in fragmentary.

DESCRIPTION OF THE PREFERRED EMBODIMENTS

Figure 1:
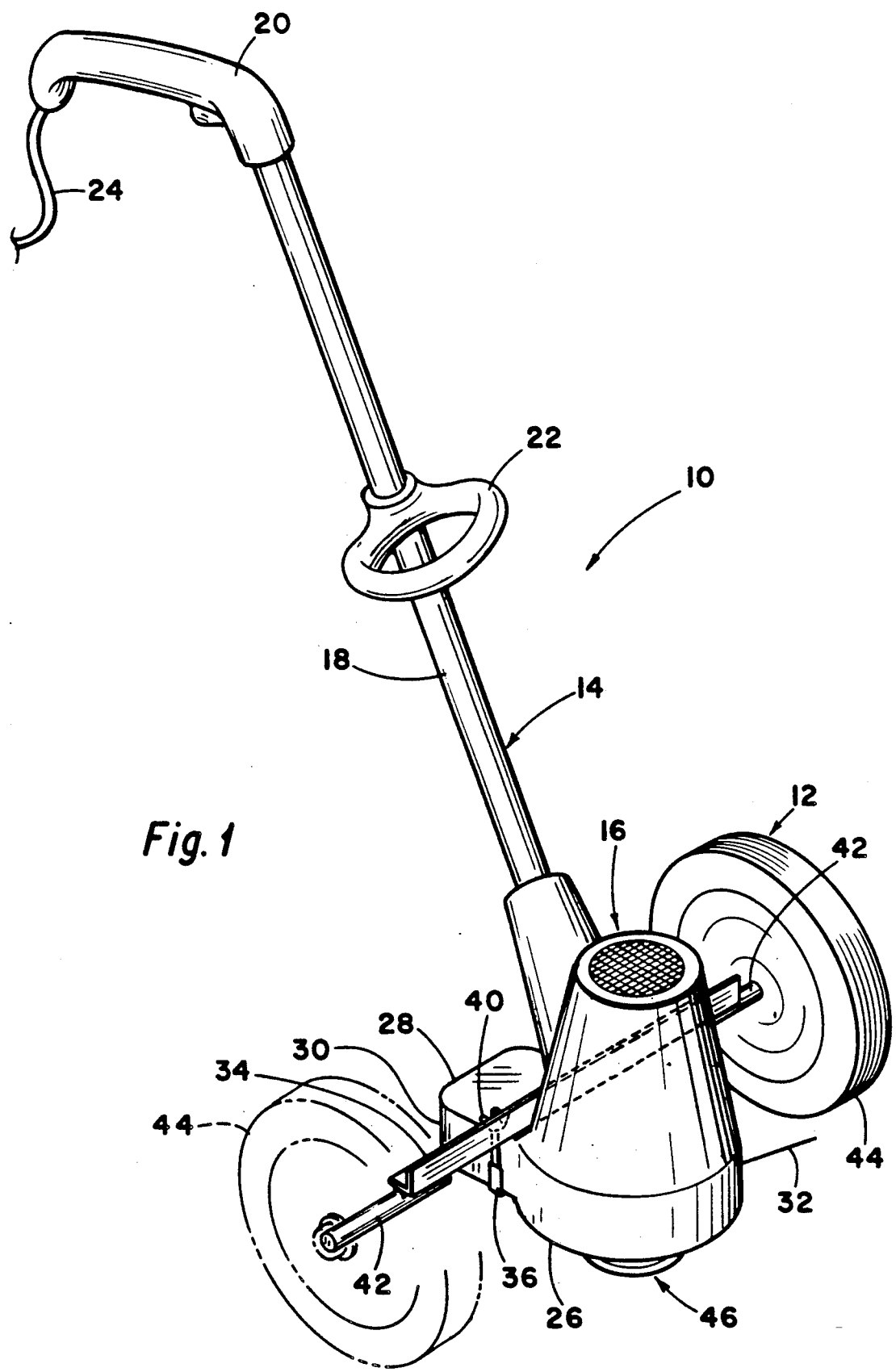
FIG. 1 is a perspective view of a wheeled attachment for a grass trimmer according to my invention as it is in position upon a typical flexible line grass trimmer.

FIG. 1 is a perspective view of a wheeled attachment and grass trimmer combination 10, generally, showing a wheeled attachment 12, generally, according to my invention as it is in position upon a typical flexible line grass trimmer 14, generally. The type of grass trimmer 14 shown in FIG. 1 is an electric-powered type which has an electric motor 16, generally, attached at one end of a long shaft 18 and a first handle 20 adjacent the opposite end of shaft 18. A second handle 22 is in position midway of shaft 18. An electric cord 24 having an attachment plug (not shown) passes through handle 20 and interiorly of shaft 18 to connect with motor 16.

The typical electric motor 16 has a housing 26, or protective cover, which may have a housing extension 28. The usual housing extension 28 will have a rim or lip 30 which will provide one means for attaching my wheeled attachment 12 to the grass trimmer 14.

I have designed my wheeled attachment 12 to be adaptable for attaching to various structural modifications of the grass trimmer 14. In designing my wheeled attachment 12 as I have, I have had to take into consideration the possible structural differences of various grass trimmers, especially the most suitable distances which should be maintained between a plastic filament cutting element 32 and the surface of the ground.

For proper mounting of my wheeled attachment 12, I have provided a straight transverse member 34 which is attachable to the housing 26 by means of a J-bolt 36 fitting around the lower edge of lip 30, passing through a slot 38, and held securely and easily detachable in position by a wing nut 40.

Figure 2:
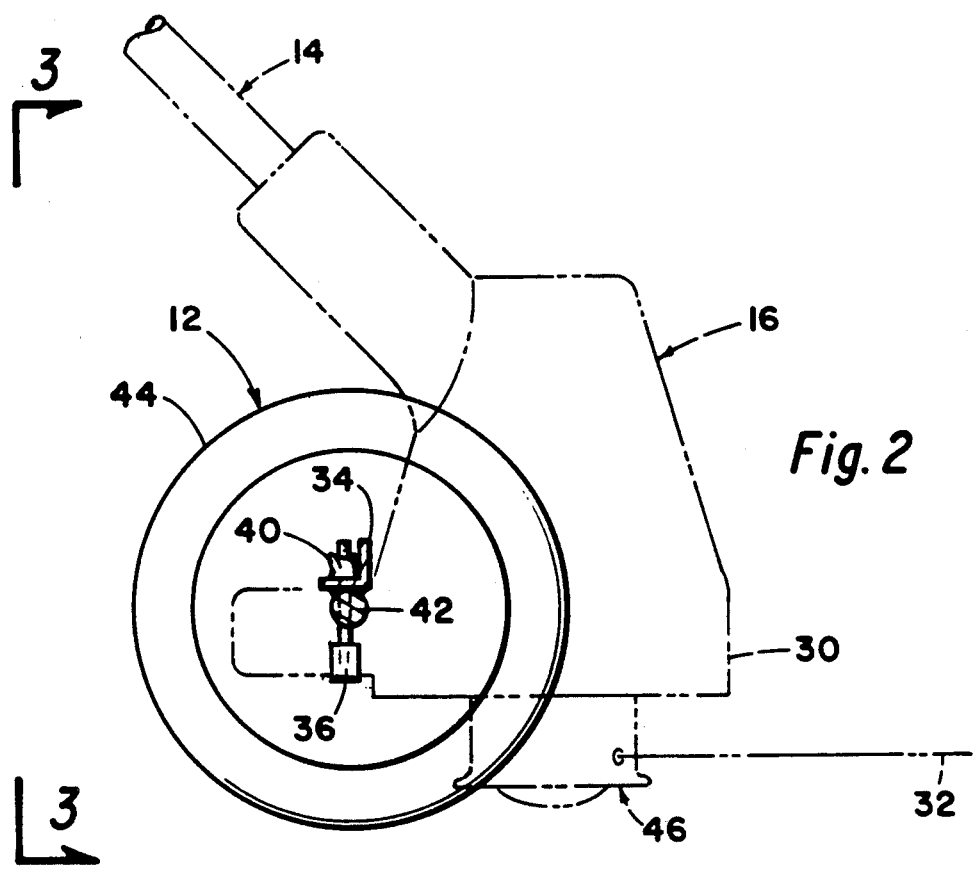
FIG. 2 is a side elevational view of a wheeled attachment for a grass trimmer according to my invention as it is in position upon a typical flexible line grass trimmer with the grass trimmer shown in fragmentary and in phantom.
Figure 3:
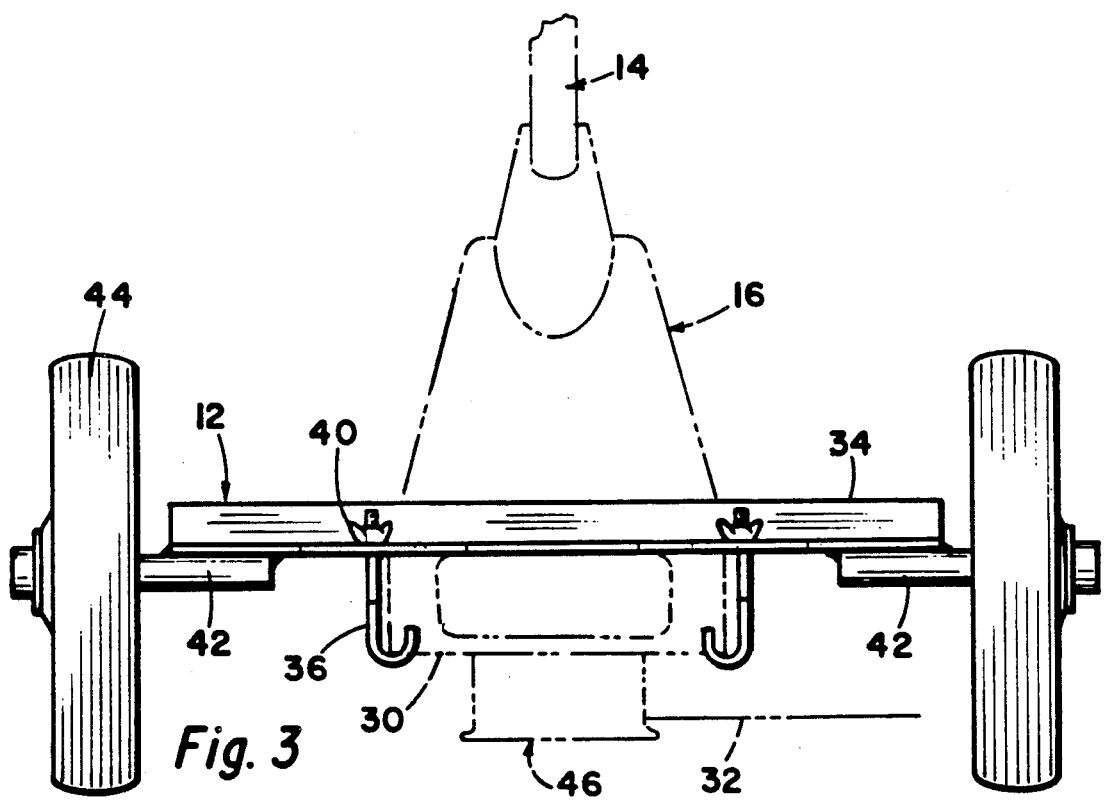
FIG. 3 is a rear elevational view of a wheeled attachment for a grass trimmer according to my invention as it is in position upon a typical flexible line grass trimmer with the grass trimmer shown in fragmentary and in phantom and taken along the lines 3—3 of FIG. 2.
Figure 4:
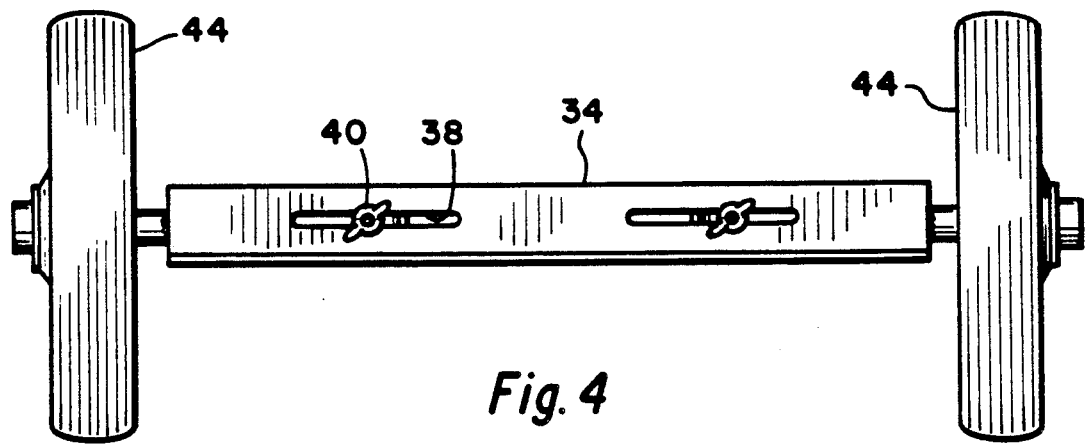
FIG. 4 is a top view of a wheeled attachment for a grass trimmer according to my invention.
Figure 5:
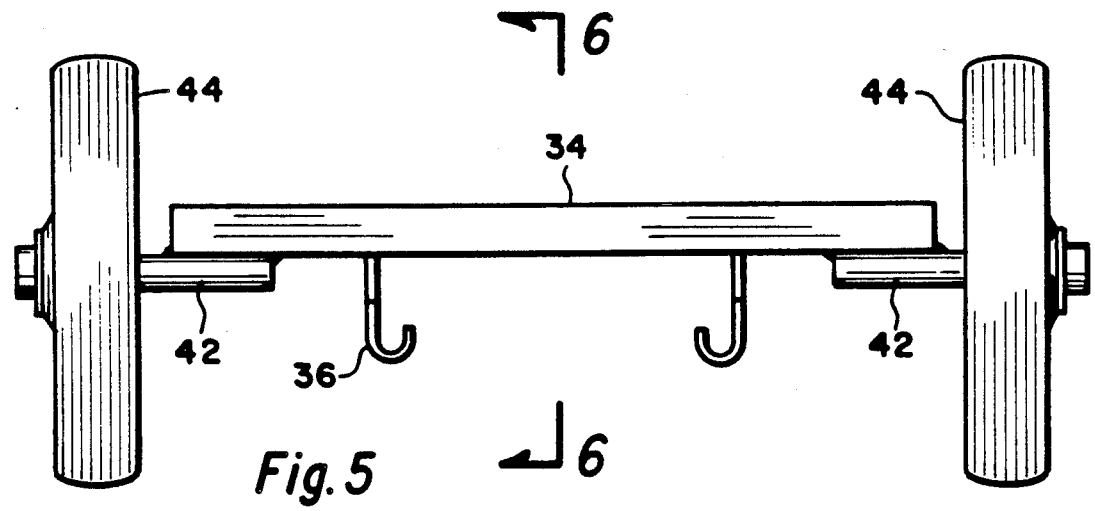
FIG. 5 is a front elevational view of a wheeled attachment for a grass trimmer according to my invention.
Figure 6:
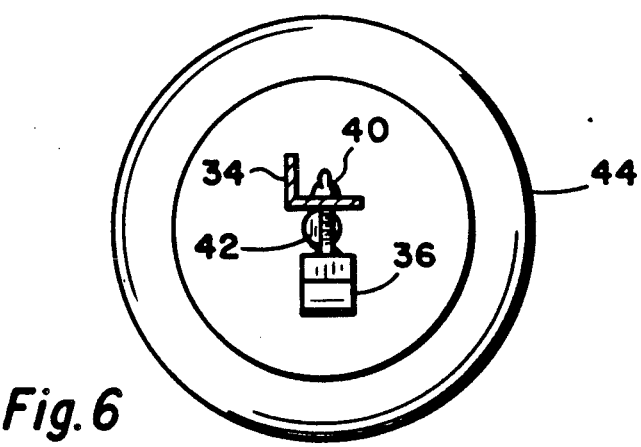
FIG. 6 is a side sectional view of a wheeled attachment for a grass trimmer according to my invention taken along the lines 6—6 of FIG. 5.

At each end of the transverse member 34 I have provided a wheel assembly which I show as an axle portion 42 having mounted bearably thereon by conventional means (not shown) a wheel 44. In certain types of grass trimmers, such as the type I am showing in the FIGS. 1-3, the structure is such that the wheels 44 must be spaced apart at a greater distance between them than the maximum operating diameter of the plastic filament 32 which is normally wound on a cartridge assembly 46, generally. In some types of structures, the geometry of the grass trimmer will permit the wheeled attachment to be mounted farther back from the motor 16 so that the wheels may be set closer together, at a distance apart less than the maximum cutting diameter of the filament 32. Then, in this configuration the user may perform more efficient trimming operations without interferences from the wheels.

In FIGS. 8 and 9 I have shown an alternate embodiment of my invention which is especially adaptable for use with a gasoline-powered grass trimmer as shown by grass trimmer and wheeled attachment 48, generally. Gasoline-powered grass trimmer 50, generally, includes a gasoline engine 52 at one end and connected by a flexible line passing through shaft 54 to a grass cutting assembly 56, generally, which includes a flexible grass cutting filament 58.

In this embodiment I have provided for a wheeled attachment 60, generally, to be detachably securable, and readily adjustable, upon shaft 54 by means of a clamping arrangement formed by one clamp member 62 attachable by means of bolts 64 to a second clamp member 66 in a manner that the clamping members 62 and 66 may be readily movable to suit the user.

Clamp member 66 is securably and adjustably attachable by means of bolt 68 and nut 70 to slotted bar member 72 which includes slot 74 to permit suitable adjustment of the wheeled attachment 60. Then slotted bar member 72 is secured to a transverse member 76 to which an axle portion 78 is secured at each end. As in the embodiment of FIGS. 1-6, wheels 80 are bearably mounted. Particularly in the embodiment shown in FIG. 8, wheels 80 may be positioned more closely together than the maximum cutting diameter described by filament 58 for enhanced edging capability.

If additional height or adjustment is considered necessary, I have provided for a bar extension member 82, as shown in FIG. 9.

I have also provided, as shown in FIG. 7, for a swivelable wheel component 84, generally, for use as desired. In the embodiment shown in FIG. 7, I have shown an adjustable transverse bar member 86 which includes adjustment slots 88. Wheels 90 may be attachable to transverse member 86 by having a conventional swivel member 92 secured thereto by bolt 94 and nut 96.

Since many different embodiments of my invention may be made without departing from the spirit and scope thereof, it is to be understood that the specific embodiments described in detail herein are not to be taken in a limiting sense, since the scope of the invention is best defined by the appended claims.

I claim:

1. A handleless wheeled attachment in combination with a grass trimmer to support and maintain the grass trimmer in a substantially horizontal spaced position in relation to the ground during operation, in which the grass trimmer includes:
   an elongated shaft,
   a grass cutting head, including a rotatable member carrying a grass cutting filament, adjacent a first end of the elongated shaft, said rotatable member and said grass cutting filament defining a maximum cutting diameter for said grass trimmer,
   a first hand grip at a second end of the elongated shaft,
   a second hand grip part way down the elongated shaft and
   power means for driving the rotatable member, the wheeled attachment comprising:
   a mounting member comprising a straight transverse member having a wheel at each end thereof, the distance between said wheels being less than said maximum cutting diameter, and
   means for securing the mounting member detachably in position on the trimmer in a manner that the transverse member is mounted rearwardly of the vertical axis of the rotatable member, said means for securing the mounting member including:
      a height adjustable bar assembly having an elongate first bar member attachable to said transverse member such that said first bar member will extend upwardly from said transverse member, said height adjustable bar assembly also having a clamping means for clamping the handleless wheeled attachment to the elongated shaft of the grass trimmer.

2. A handleless wheeled attachment in combination with a grass trimmer as described in claim 1, wherein:
   the bar assembly is attached to the elongated shaft between the second hand grip and the grass cutting head;
   the bar assembly further includes a second bar member securable to and downwardly depending from the clamping means and
   the first bar member is adjustably securable to and downwardly depending from the second bar member.

3. A handleless wheeled attachment in combination with a grass trimmer as described in claim 2, wherein: the first bar member comprises a slotted bar member to permit ease of adjustment of the bar assembly.

4. A handleless wheeled attachment in combination with a grass trimmer as described in claim 3, wherein: the wheels are swivelably mounted on the transverse member.

5. A handleless wheeled attachment in combination with a grass trimmer as described in claim 1, wherein said first bar member is adjustably securable to and downwardly depending from the clamping means.

6. A handleless wheeled attachment in combination with a grass trimmer as described in claim 5, wherein the first bar member is a slotted bar member.

7. A handleless wheeled attachment in combination with a grass trimmer as described in claim 1, wherein said handleless wheeled attachment has only two wheels.

8. A handleless wheeled attachment for a trimmer, said trimmer comprising an elongate shaft, a cutting head at one end of said elongate shaft, and a gripping means at the other end of said elongate shaft, wherein said handleless wheeled attachment comprises:
   an elongate transverse member having a first end and a second end;
   a first wheel rotatably positioned adjacent said first end of said transverse member;
   a second wheel rotatably positioned adjacent said second end of said transverse member;
   an upwardly extending elongate member having a lower end connected to said transverse member between the first end and the second end of said transverse member; and a connecting means, attachable to said upwardly extending elongate member, for connecting said handleless wheeled attachment to the elongate shaft of said trimmer, said connecting means being adjustably attachable to said upwardly extending elongate member such that the height at which said handleless wheeled attachment supports the cutting head of said trimmer can be adjusted.

9. The handleless wheeled attachment of claim 8, wherein said handleless wheeled attachment has only two wheels.

10. The handleless wheeled attachment of claim 8, wherein said handleless wheeled attachment is connectable to the elongate shaft of said trimmer such that said transverse member will be positioned behind the cutting head of said trimmer.

11. The handleless wheeled attachment of claim 10, wherein:

the cutting head of said trimmer includes a rotatable member carrying a cutting filament, said rotatable member and said filament defining a maximum cutting diameter for said trimmer and the distance between said first wheel and said second wheel is less than the maximum cutting diameter of said trimmer.

* * * * *